US012647927B2

(12) United States Patent
Dong

(10) Patent No.: US 12,647,927 B2
(45) Date of Patent: Jun. 2, 2026

(54) METHOD FOR LOCATING USER EQUIPMENT, NETWORK DEVICE, USER EQUIPMENT, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 506 days.

(21) Appl. No.: 18/086,480

(22) Filed: Dec. 21, 2022

(65) Prior Publication Data

US 2023/0118170 A1 Apr. 20, 2023

Related U.S. Application Data

(63) Continuation of application No. PCT/CN2020/098997, filed on Jun. 29, 2020.

(51) Int. Cl.
*H04W 64/00* (2009.01)
*H04W 4/02* (2018.01)
*H04W 24/10* (2009.01)

(52) U.S. Cl.
CPC ........... *H04W 64/00* (2013.01); *H04W 4/023* (2013.01); *H04W 24/10* (2013.01)

(58) Field of Classification Search
CPC ...... H04W 24/10; H04W 4/023; H04W 64/00
See application file for complete search history.

(56) References Cited

U.S. PATENT DOCUMENTS

| | | | | |
|---|---|---|---|---|
| 11,678,260 B2 * | 6/2023 | Sartori | ................. | H04W 48/16 370/329 |
| 2015/0011240 A1 * | 1/2015 | Xiao | ......................... | G01S 5/12 455/456.1 |
| 2018/0267134 A1 | 9/2018 | Xing | | |
| 2019/0028994 A1 * | 1/2019 | Tenny | ................... | H04W 64/00 |
| 2019/0090092 A1 * | 3/2019 | Hwang | ................ | G01S 5/0215 |
| 2022/0229146 A1 * | 7/2022 | Ko | ....................... | G01S 5/02216 |
| 2022/0377697 A1 * | 11/2022 | Bi | ........................ | G01S 5/0036 |

FOREIGN PATENT DOCUMENTS

| | | |
|---|---|---|
| CN | 103260237 A | 8/2013 |
| CN | 109842934 A | 6/2019 |
| WO | WO 2019027245 A1 | 2/2019 |

OTHER PUBLICATIONS

Indian Patent Application No. 202347000120, Office Action dated Feb. 8, 2024, 6 pages.
European Patent Application No. 20943439.8, Search and Opinion dated Mar. 4, 2024, 8 pages.
PCT/CN2020/098997 English translation of International Search Report dated Mar. 25, 2021, 2 pages.

* cited by examiner

*Primary Examiner* — Dai Phuong
(74) *Attorney, Agent, or Firm* — Cozen O'Connor

(57) ABSTRACT

A method for locating a UE includes: acquiring a relative location between an assistant UE and a target UE, reported by the assistant UE, and determining a location of the target UE based on a location of the assistant UE and the relative location.

18 Claims, 5 Drawing Sheets

301 receiving, by an assistant UE, a locating request message sent by a
network device

302 acquiring a relative location between the assistant UE and the target UE
based on the identifier of the target UE

303 reporting the relative location to the network device in response to the
locating request message

METHOD FOR LOCATING USER EQUIPMENT, NETWORK DEVICE, USER EQUIPMENT, AND STORAGE MEDIUM

CROSS-REFERENCE TO RELATED APPLICATION

This application is a continuation of International Application No. PCT/CN2020/098997, filed on Jun. 29, 2020, the entire content of which is incorporated herein by reference.

TECHNICAL FIELD

The disclosure relates to the field of locating technologies, especially to a method for locating a user equipment (UE), a UE, a network device, and a storage medium.

BACKGROUND

Currently, there are a plurality of locating technologies in mobile communication, to locate a UE. Locating accuracy requirements for some scenarios such as an Internet of Things (IoT) scenario are higher. Line of sight (LOS) and not line of sight (NLOS) transmission have a relatively great influence on the locating accuracy. Due to the presence of NLOS, a signal transmission duration and angle measured are not accurate during locating measurement. In detail, in an indoor environment, there may be only NLOS between a UE and a base station. Therefore, the locating accuracy loss is greater and the locating accuracy requirements may not be satisfied.

SUMMARY

According to a first aspect of the disclosure, a method for locating a UE is provided and includes: acquiring a relative location between an assistant UE and a target UE, reported by the assistant UE, and determining a location of the target UE based on a location of the assistant UE and the relative location.

According to a second aspect of the disclosure, a method for locating a UE is provided and includes: receiving a locating request message sent by a network device, in which the locating request message carries an identifier of a target UE to be located; acquiring a relative location between the assistant UE and the target UE based on the identifier of the target UE; and reporting the relative location to the network device in response to the locating request message.

According to a third aspect of embodiments of the disclosure, a UE or a network device is provided and includes: a processor, a transceiver, a memory, and an executable program stored on the memory and run by the processor, in which the processor performs steps of the method for locating a UE when running the executable program.

According to a fourth aspect of embodiments of the disclosure, a storage medium with an executable program stored thereon is provided, in which the executable program implements steps of the method for locating a UE when executed by a processor.

It is to be understood that both the foregoing general description and the following detailed description are exemplary and explanatory only and are not restrictive of embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of embodiments of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Terms used in embodiments of the disclosure are merely for describing specific examples and are not intended to limit the embodiments of the disclosure. The singular forms "one", "the", and "this" used in the embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

Figure 1:
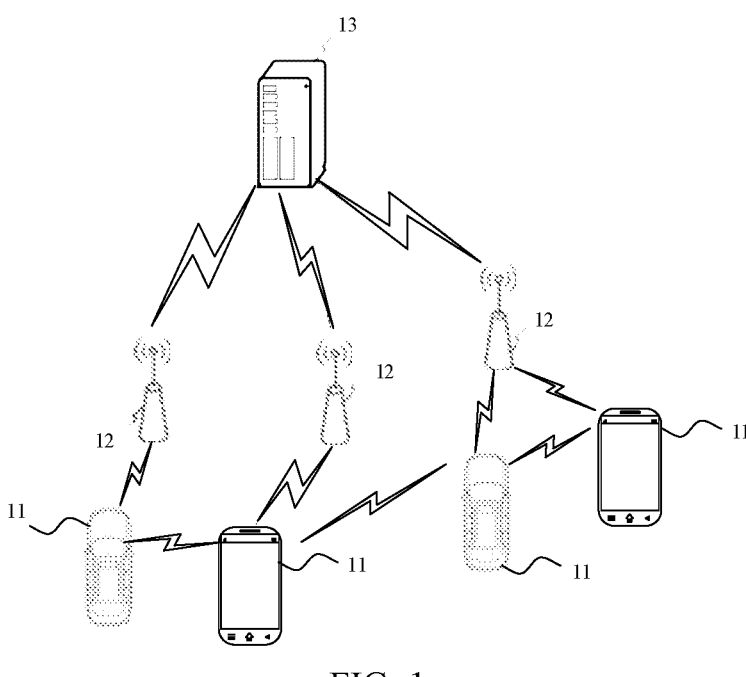
FIG. 1 is a diagram illustrating a structure of a wireless communication system according to some embodiments.

Referring to FIG. 1, FIG. 1 is a diagram illustrating a structure of a wireless communication system according to embodiments of the disclosure. As illustrated in FIG. 1, the wireless communication system is a communication system based on a cellular mobile communication technology. The wireless communication system includes several terminals 11 and several base stations 12.

The terminal 11 refers to a device that provides voice and/or data connectivity for a user. The terminal 11 may communicate with one or more core networks through a radio access network (RAN). The terminal 11 may be an internet of things (IoT) terminal, for example, a sensor device, a mobile phone (or referred to as a cellular phone), or a computer having an IoT terminal, such as a fixed, portable, compact, handheld, computer built-in or vehicle-mounted device. For example, a station (STA), a subscriber unit, a subscriber station, a mobile station, a mobile, a remote station, an access point, a remote terminal, an access terminal, a user terminal, a user agent, a user device, or a UE. Or, the terminal 11 may be a device of an unmanned vehicle. Or, the terminal 11 also may be a vehicle-mounted device, for example, a vehicle computer with a wireless communication function, or a wireless communication device externally connected to a vehicle computer. Or, the terminal 11 also may be a roadside device, for example, a street lamp, a signal lamp, or other roadside device with a wireless communication function.

The base station 12 may be a network side device in the wireless communications system. The wireless communication system may be a fourth generation (4G) mobile communication system, also referred to as a long-term evolution (LTE) system; or the wireless communications system may be a fifth generation (5G) mobile communication system, also referred to as a new radio (NR) system or a 5G NR system. Or, the wireless communication system may be a next generation system of the 5G system. An access network in the 5G system may be referred to as a new generation-radio access network (NG-RAN). Or, it is a machine type communication (MTC) system.

The base station 12 may be an evolved node base station (eNB) used in the 4G system. Alternatively, the base station 12 may also be a next generation node base station (gNB) adopting a centralized and distributed architecture in the 5G system. When the base station 12 adopts the centralized and distributed architecture, it usually includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a protocol stack of a physical (PHY) layer. Embodiments of the disclosure may not limit the implementation manner of the base station 12.

A wireless connection may be established between the base station 12 and the terminal 11 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in embodiments of the disclosure.

The executive bodies involved in embodiments of the disclosure include but not limited to a UE in a cellular mobile communication system and a base station in cellular mobile communication.

Figure 2:
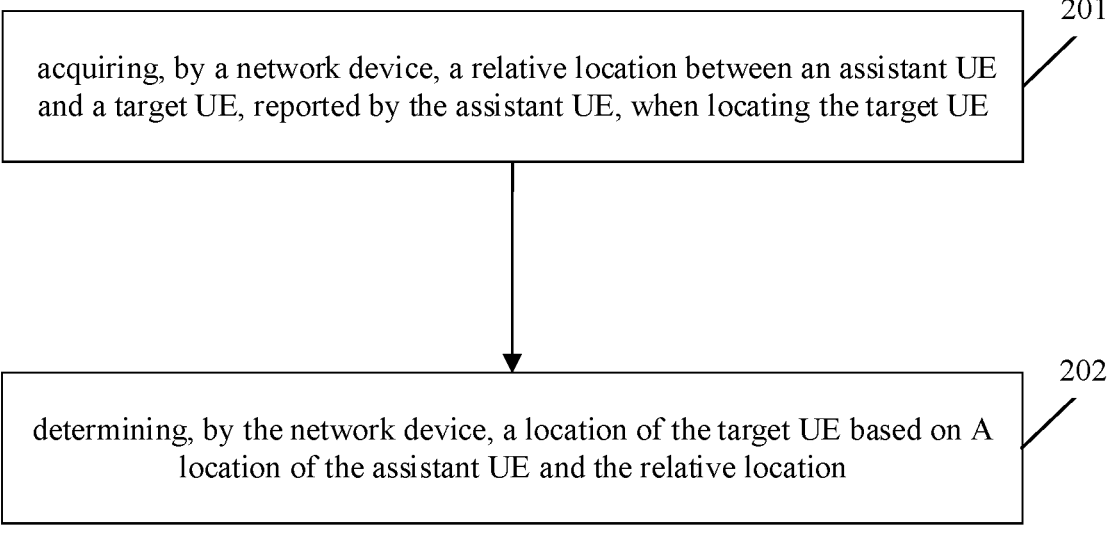
FIG. 2 is a flowchart illustrating a method for locating a UE according to some embodiments.

FIG. 2 is a flowchart illustrating a method for locating a UE according to some embodiments. As illustrated in FIG. 2, the method for locating a UE provided in embodiments of the disclosure includes the following.

At step 201, a network device acquires a relative location between an assistant UE and a target UE, reported by the assistant UE, when locating the target UE.

In embodiments of the disclosure, the network device needs to determine the assistant UE first before locating the target UE. The assistant UE refers to a UE that may be in an LOS scenario with the network device. When the network device locates the UE in the LOS scenario with the network device, refraction or reflection of communication signals may be avoided, so that the UE may be located more accurately. When the nearby target UE is located through the assistant UE, communication between the assistant UE and the nearby UE may be performed in the LOS scenario, for example, sidelink communication may be performed among a plurality of UEs in a certain area range, which may be the LOS scenario communication. For example, a communication scenario among a plurality of UEs in the same working area, such as a communication scenario among a plurality of UEs on a square or a coast, belongs to the LOS scenario communication. By means of accurate locating between the network device and the assistant UE and accurate locating between the assistant UE and the target UE, the network device may complete accurate locating of the target UE based on the assistant UE and may achieve accurate locating of the target UE by setting the assistant UE even if the target UE is in a building.

In embodiments of the disclosure, the assistant UE is determined in the following two ways.

A first way is that the network device receives a measurement report of a UE and determines the assistant UE based on the measurement report; the measurement report includes at least one of: location information, a reference signal time difference (RSTD), a reference signal receiving power (RSRP), or a signal to noise ratio (SINR). The network device determines dynamically the assistant UE based on at least one of: the location information, the RSTD, the RSRP, or the SINR. For example, when the network device determines that the SINR of one or more of the plurality of UEs accessing the network device is higher than a set threshold, it indicates that the communication quality between the UE or these UEs and the network device is relatively higher, the distance between the UE and the network device is relatively close, and there is no multipath interference between the UE and the network device, that is, the LOS scenario communication may be performed between the UE with the SINR higher than the set threshold and the network device and the UE with the SINR higher than the set threshold is determined as the assistant UE. Similarly, when the RSTD of the UE is less than the set threshold, it may also be considered that the LOS scenario communication is performed between the UE and the network device, and the corresponding UE is used as the assistant UE. However, when the RSRP of the UE exceeds the set threshold, it may also be considered that the LOS scenario communication is performed between the UE and the network device, and the corresponding UE is used as the assistant UE. Whether the UE may be used as the assistant UE may also be comprehensively determined based on the RSTD, the RSRP, and the SINR of the UE.

In embodiments of the disclosure, the LOS scenario communication between the UE and the network device may be determined based on the location reported by the UE. The network device may determine whether communication signals of the UE may have multipath refraction or reflection phenomenon based on the specific location of the UE, and further determine whether the UE may be used as the assistant UE. The network device also may comprehensively determine whether the UE may be used as the assistant UE based on the location information, the RSTD, the RSRP, and the SINR of the UE.

A second way is using a UE that is fixed at a set location based on a communication environment as the assistant UE. A location of the assistant UE that is fixed is configured into the network device, so that the location of the assistant UE configured for the network device is clear. The assistant UE locates the nearby UE, and the location of the target UE may be determined based on the relative location between the assistant UE and the target UE reported by the assistant UE.

At step 202, the network device determines a location of the target UE based on a location of the assistant UE and the relative location.

In embodiments of the disclosure, the network device may directly acquire the fixed location of the assistant UE, or dynamically determine the UE in the LOS scenario communication with the network device as the assistant UE based on the measurement report of the UE and accurately locate the determined assistant UE. Further through the assistant UE locating the target UE, the location of the target UE may be accurately determined.

In order to enable the assistant UE to locate the nearby UE, the network device may configure a communication resource for the assistant UE, and the assistant UE is enabled to discover the nearby UE based on the resource. That is, a network side configures a communication resource for mutual discovery for the UEs, and the UEs may discover each other based on the configured time-frequency communication resource. The assistant UE discovers the nearby UE based on the resource, and reports an identifier of the discovered nearby UE to the network device. The assistant UE further locates the discovered nearby UE, and determines relative location between the assistant UE and the discovered nearby UE when discovering the nearby UE based on the resource.

The network device sends a request message for acquiring the target UE to the corresponding assistant UE when needing to locate the UE based on the identifier of the nearby UE reported by the assistant UE. The assistant UE locates the target UE, acquires a relative location relationship between the assistant UE and the target UE, and reports the relative location relationship between the assistant UE and the target UE to the network device. As an example, when there are a plurality of assistant UEs of the target UE, the network device may send a locating request of the target UE to more than one assistant UE, and the network device may determine location of the target UE based on mathematical average or weighted average or one-selected-from-multiple or other processing means when receiving the relative location between the assistant UE and the target UE reported by two or more assistant UEs.

In embodiments of the disclosure, the network device sends a locating request message to the assistant UE. The locating request message carries identifier information of the target UE to be located. In an example, the network device has acquired location of the assistant UE, for example, the assistant UE is the UE preset at the set location based on the communication environment, or the UE reports the location to the network device when it is set as the assistant UE, or the assistant UE assists the network device to complete the locating of the assistant UE. In response to identifying the received message as the locating request message of the target UE to be located when receiving the locating request message in this example, the assistant UE directly acquires the relative location between the assistant UE and the target UE locally based on the identifier information of the target UE to be located, or determines the relative location between the assistant UE and the target UE by locating the target UE to be located.

The locating request message carries identifier information of the target UE to be located and requests a location of the assistant UE. In an example, the network device does not acquire location of the assistant UE. Therefore, the assistant UE needs to be located in addition to information for acquiring the location of the target UE is sent to the assistant UE. When receiving the locating request message in the example, the assistant UE directly acquires the relative location between the assistant UE and the target UE locally based on the identifier information of the target UE to be located, or determines the relative location between the assistant UE and the target UE by locating the target UE to be located. And the assistant UE coordinates the network to complete its locating.

As an example, in response to acquiring the relative location between the assistant UE and the target UE locally after receiving the locating request message, the assistant UE reports the acquired relative location to the network device; that is to say, the assistant UE has determined the relative location between the assistant UE and the target UE before receiving the locating request message, for example, it has completed locating of the target UE when discovering the UE using a discovery resource. Or, the assistant UE determines a relative location between the assistant UE and the target UE based on a sidelink communication. The sidelink communication is performed between the assistant UE and the target UE before the locating request message is received.

Or, as another example, in response to the assistant UE not acquiring the relative location between the assistant UE and the target UE locally, the assistant UE locates the target UE, determines the relative location between the assistant UE and the target UE, and reports the relative location between the assistant UE and the target UE to the network device. That is, before receiving the locating request message of the target UE, the assistant UE does not locate the target UE nor acquire the relative location between the assistant UE and the target UE, thus that it needs to locate the target UE.

In embodiments of the disclosure, the assistant UE locates the target UE by the following.

The relative location between the assistant UE and the target UE is determined based on an Uu interface communication, in which the assistant UE and the target UE send data or receive data sent by an opposite terminal, on an uplink resource of the Uu interface. In such a communication situation, the network device configures the uplink resource of the Uu interface for relative locating between UEs, and resource information of relative locating signals at the Uu interface may be configured for the assistant UE and the target UE, and the assistant UE and the target UE monitor on the uplink resource of the Uu interface configured by the network device, thereby monitoring an uplink signal for relative locating sent by the UE, completing calculation of a signal flight time and an angle based on the uplink signal, and acquiring the relative location between the assistant UE and the target UE.

Or, the assistant UE determines the relative location between the assistant UE and the target UE based on a sidelink communication. The sidelink communication is performed between the assistant UE and the target UE. The assistant UE and the target UE may complete calculation of the signal flight time and the angle by means of the sidelink between UEs, thereby acquiring the relative location between the assistant UE and the target UE.

In embodiments of the disclosure, it is only an example to determine the relative location between the assistant UE and the target UE by means of the flight time and the signal transmission angle, and other locating ways further may be adopted, which will not be repeated herein.

Figure 3:
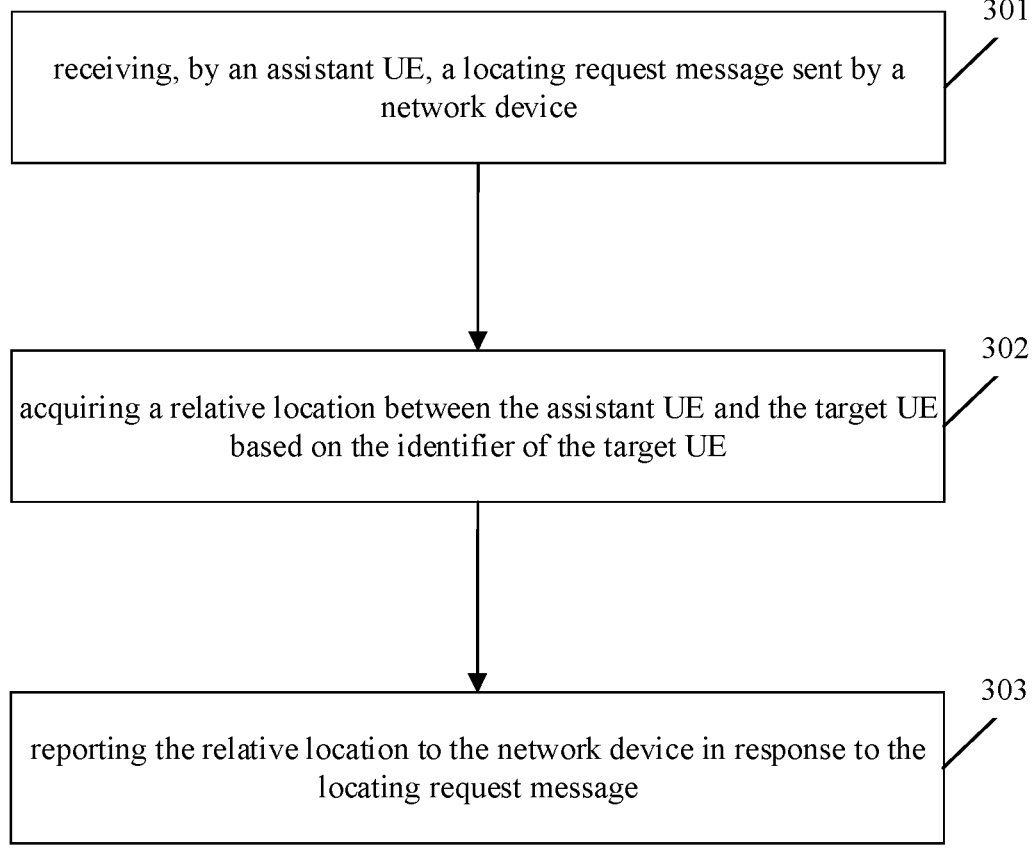
FIG. 3 is a flowchart illustrating a method for locating a UE according to some embodiments.

FIG. 3 is a flowchart illustrating a method for locating a UE according to some embodiments. As illustrated in FIG. 3, the method for locating a UE provided in embodiments of the disclosure includes the following.

At step 301, an assistant UE receives a locating request message sent by a network device. The locating request message carries an identifier of a target UE to located.

The assistant UE refers to a UE that may be in an LOS scenario with the network device. When the network device locates the UE in the LOS scenario with the network device, refraction or reflection of communication signals may be avoided, so that the UE may be located more accurately. When the assistant UE locates the nearby target UE, communication between the assistant UE and the nearby UE may be performed in the LOS scenario, for example, side-link communication may be performed among a plurality of UEs in a certain area range, which may be the LOS scenario communication.

In embodiments of the disclosure, the assistant UE is determined by the following two ways.

A first way is that the network device receives a measurement report of a UE and determines the assistant UE based on the measurement report; the measurement report includes at least one of: location information, an RSTD, an RSRP, or an SINR. The network device determines dynamically the assistant UE based on at least one of: the location information, the RSTD, the RSRP, or the SINR. For example, when the network device determines that the SINR of one or more of the plurality of UEs accessing the network device is higher than a set threshold, it indicates that the communication quality between the UE or these UEs and the network device is relatively higher, the distance between the UE and the network device is relatively close, and there is no multipath interference between the UE and the network device, that is, the LOS scenario communication may be performed between the UE with the SINR higher than the set threshold and the network device, and the UE with the SINR higher than the set threshold is determined as the assistant UE. Similarly, when the RSTD of the UE is less than the set threshold, it may also be considered that the LOS scenario communication is performed between the UE and the network device, and the corresponding UE is used as the assistant UE. However, when the RSRP of the UE exceeds the set threshold, it may also be considered that the LOS scenario communication is performed between the UE and the network device, and the corresponding UE is used as the assistant UE. Whether the UE may be used as the assistant UE may also be comprehensively determined based on the RSTD, the RSRP, and the SINR of the UE.

In embodiments of the disclosure, the LOS scenario communication between the UE and the network device may be determined based on the location reported by the UE. The network device may determine whether communication signals of the UE may have multipath refraction or reflection phenomenon based on the specific location of the UE, and further determine whether the UE may be used as the assistant UE. The network device also may comprehensively determine whether the UE may be used as the assistant UE based on the location information, the RSTD, the RSRP, and the SINR of the UE.

A second way is using a UE that is fixed at a set location based on a communication environment as the assistant UE. A location of the assistant UE that is fixed is configured into the network device, so that the location of the assistant UE configured for the network device is clear. The assistant UE locates the nearby UE, and the location of the target UE may be determined based on the relative location between the assistant UE and the target UE reported by the assistant UE.

In order to enable the assistant UE to discover and locate the nearby UE, the network device may configure a communication resource for the assistant UE, and the assistant UE is enabled to discover the nearby UE based on the resource. That is, a network side configures a communication resource for mutual discovery for the UEs, and the UEs may discover each other based on the configured communication time-frequency resource. The assistant UE discovers the nearby UE based on the resource, and reports an identifier of the discovered nearby UE to the network device. The assistant UE locates the discovered nearby UE, and determines relative location between the assistant UE and the discovered nearby UE when discovering the nearby UE based on the resource. The network device sends a request message for acquiring the target UE to the corresponding assistant UE when needing to locate the UE based on the identifier of the nearby UE reported by the assistant UE. The assistant UE locates the target UE to acquire a relative location relationship between the assistant UE and the target UE, and report the relative location relationship between the assistant UE and the target UE to the network device.

At step 302, a relative location between the assistant UE and the target UE is acquired based on the identifier of the target UE.

As an example, in response to acquiring the relative location between the assistant UE and the target UE locally after receiving the locating request message, the assistant UE reports the acquired relative location to the network device; that is to say, the assistant UE has determined the relative location between the assistant UE and the target UE before receiving the location request message, for example, it has completed locating of the target UE when discovering the UE using a discovery resource. Or, the assistant UE determines a relative location between the assistant UE and the target UE based on a sidelink communication. The sidelink communication is performed between the assistant UE and the target UE before the locating request message is received.

Or, as another example, in response to not acquiring the relative location between the assistant UE and the target UE locally, the assistant UE locates the target UE, determines the relative location between the assistant UE and the target UE, and reports the relative location between the assistant UE and the target UE to the network device. That is, the assistant UE does not locate the target UE nor acquire the relative location between the assistant UE and the target UE before receiving the locating request message of the target UE, such that it needs to locate the target UE.

In embodiments of the disclosure, the assistant UE locates the target UE by the following.

The relative location between the assistant UE and the target UE is determined based on an Uu interface communication, in which the assistant UE and the target UE send data or receive data sent by an opposite terminal, on an uplink resource of the Uu interface. In such a communication situation, the network device configures the uplink resource of the Uu interface for relative locating between UEs, and resource information of relative locating signals at the Uu interface may be configured for the assistant UE and the target UE, and the assistant UE and the target UE monitor on the uplink resource of the Uu interface configured by the network device, thereby monitoring an uplink signal for relative locating sent by the UE, completing calculation of a signal flight time and an angle based on the uplink signal, and acquiring the relative location between the assistant UE and the target UE.

Or, the assistant UE determines the relative location between the assistant UE and the target UE based on a sidelink communication. The sidelink communication is performed between the assistant UE and the target UE. The assistant UE and the target UE may complete calculation of the signal flight time and the angle by means of the sidelink between UEs, thereby acquiring the relative location between the assistant UE and the target UE.

At step 303, the relative location is reported to the network device in response to the locating request message.

When acquiring the relative location between the assistant UE and the target UE, the assistant UE reports the acquired relative location to the network device in response to the locating request message.

Figure 4:
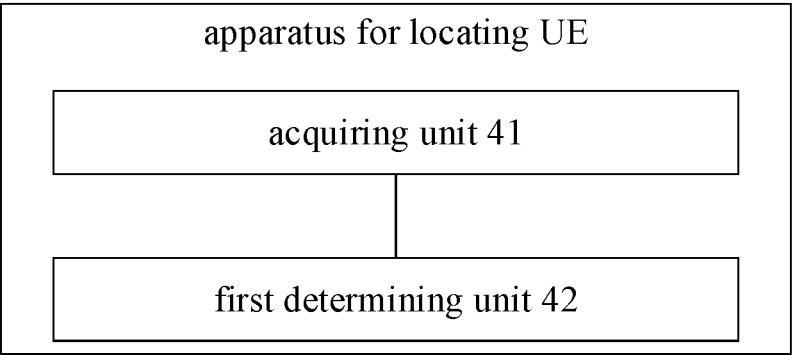
FIG. 4 is a diagram illustrating a structure of an apparatus for locating a UE according to some embodiments.

FIG. 4 is a diagram illustrating a structure of an apparatus for locating a UE according to some embodiments. As illustrated in FIG. 4, the apparatus for locating a UE provided in embodiments of the disclosure includes an acquiring unit 41 and a first determining unit 42.

The acquiring unit 41 is configured to acquire a relative location between an assistant UE and a target UE, reported by the assistant UE, when the target UE is located.

The first determining unit 42 is configured to determine a location of the target UE based on a location of the assistant UE and the relative location.

On the basis of the apparatus for locating a UE as illustrated in FIG. 4, the apparatus for locating a UE provided in embodiments of the disclosure further includes a receiving unit (not illustrated in FIG. 4) and a second determining unit (not illustrated in FIG. 4).

The receiving unit is configured to receive a measurement report of a UE.

The second determining unit is configured to determine the assistant UE based on the measurement report.

In some embodiments, the measurement report includes at least one of: location information, an RSTD, an RSRP, or an SINR.

The first determining unit 42 is further configured to determine dynamically the assistant UE based on at least one of: the location information, the RSTD, the RSRP, or the SINR.

In some embodiments, the acquiring unit 41 is further configured to acquire the location of the assistant UE when the target UE is located.

The first determining unit 42 is further configured to determine the location of the target UE based on the location of the assistant UE and the relative location between the assistant UE and the target UE reported by the assistant UE.

On the basis of the apparatus for locating a UE as illustrated in FIG. 4, the apparatus for locating a UE provided in embodiments of the disclosure further includes a first configuration unit (not illustrated in FIG. 4).

The first configuration unit is configured to, when using a UE that is fixed at a set location based on a communication environment as the assistant UE, configure a location of the UE that is fixed, into a network device.

On the basis of the apparatus for locating a UE as illustrated in FIG. 4, the apparatus for locating a UE provided in embodiments of the disclosure further includes a second configuration unit (not illustrated in FIG. 4).

The second configuration unit is configured to configure a resource for the assistant UE. The resource is configured for the assistant UE to discover a nearby UE to acquire a relative location between the assistant UE and the nearby UE.

On the basis of the apparatus for locating a UE as illustrated in FIG. 4, the apparatus for locating a UE provided in embodiments of the disclosure further includes a receiving unit (not illustrated in FIG. 4).

The receiving unit is configured to receive an identifier of the nearby UE discovered by the assistant UE reported by the assistant UE.

On the basis of the apparatus for locating a UE as illustrated in FIG. 4, the apparatus for locating a UE provided in embodiments of the disclosure further includes a sending unit (not illustrated in FIG. 4).

The sending unit is configured to send a locating request message to the assistant UE, in which the locating request message carries identifier information of the target UE to be located; or the locating request message carries identifier information of the target UE to be located and requests a location of the assistant UE.

In some embodiments, the acquiring unit 41, the first determining unit 42, the second determining unit, the first configuration unit, the second configuration unit, the receiving unit, the sending unit, and the like may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), universal processors, controllers, micro controller units (MCUs), microprocessors or other electronic components, or may be implemented in combination with one or more radio frequency (RF) antennas, to perform the above method for sidelink communication of the user.

In embodiments of the disclosure, the specific way in which each module in the apparatus for locating a UE as illustrated in FIG. 4 performs the operation has been described in a embodiments of the method and will not be elaborated herein.

Figure 5:
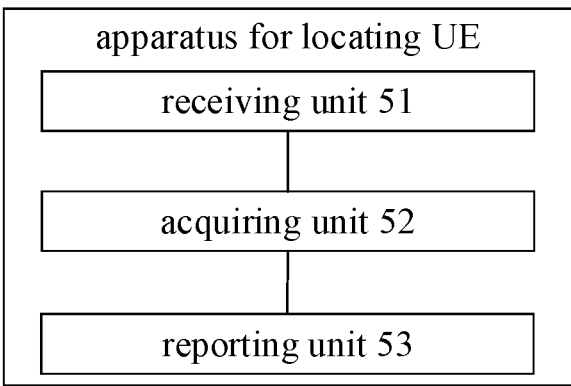
FIG. 5 is a diagram illustrating a structure of an apparatus for locating a UE according to some embodiments.

FIG. 5 is a diagram illustrating a structure of an apparatus for locating a UE according to some embodiments. As illustrated in FIG. 5, the apparatus for locating a UE provided in embodiments of the disclosure includes a receiving unit 51, an acquiring unit 52, and a reporting unit 53.

The receiving unit 51 is configured to receive a locating request message sent by a network device. The locating request message carries an identifier of a target UE to be located.

The acquiring unit 52 is configured to acquire a relative location between the assistant UE and the target UE based on the identifier of the target UE.

The reporting unit 53 is configured to report the relative location to the network device in response to the locating request message.

In some embodiments, the assistant UE includes: an assistant UE dynamically specified by the network device based on a measurement report of a UE; or using a UE that is fixed at a set location based on a communication environment as the assistant UE.

In some embodiments, the receiving unit 51 is further configured to receive a resource configured by the network device, the assistant UE being enabled to discover a nearby UE based on the resource.

On the basis of the apparatus for locating a UE as illustrated in FIG. 5, the apparatus for locating a UE provided in embodiments of the disclosure further includes a discovery unit (not illustrated in FIG. 5).

The discovery unit is configured to discover the nearby UE based on the resource, and report by the reporting unit an identifier of the discovered nearby UE to the network device.

On the basis of the apparatus for locating a UE as illustrated in FIG. 5, the apparatus for locating a UE provided in embodiments of the disclosure further includes a locating unit (not illustrated in FIG. 5).

The locating unit is configured to locate the discovered nearby UE and determine a relative location between the assistant UE and the discovered nearby UE when discovering the nearby UE based on the resource.

In some embodiments, when receiving the locating request message, the receiving unit 51 triggers the acquiring unit 52 to acquire relative location between the assistant UE and the target UE locally, and trigger the reporting unit 53 to report the acquired a relative location to the network device.

In some embodiments, in response to not acquiring the relative location between the assistant UE and the target UE locally, the acquiring unit 51 triggers the locating unit to locate the target UE, to determine the relative location between the assistant UE and the target UE, and triggers the reporting unit 53 to report the relative location between the assistant UE and the target UE to the network device.

In some embodiments, the locating unit is further configured to determine the relative location between the assistant UE and the target UE based on an Uu interface communication. The assistant UE and the target UE send data or receive data sent by an opposite terminal, on an uplink resource of the Uu interface.

In some embodiments, the locating unit is further configured to determine the relative location between the assistant UE and the target UE, based on a sidelink communication, in which the sidelink communication is performed between the assistant UE and the target UE.

In some embodiments, the receiving unit 51, the acquiring unit 52, the reporting unit 53, the discovery unit, the locating unit and the like may be implemented by one or more CPUs, GPUs, BPs, ASICs, DSPs, PLDs, CPLDs, FPGAs, universal processors, controllers, MCUs, microprocessors or other electronic components, or may be implemented in combination with one or more RF antennas, to perform the above method for sidelink communication of the user.

In embodiments of the disclosure, the specific way in which each module in the apparatus for locating a UE as illustrated in FIG. 5 performs the operation has been described in embodiments of the method and will not be elaborated herein.

Figure 6:
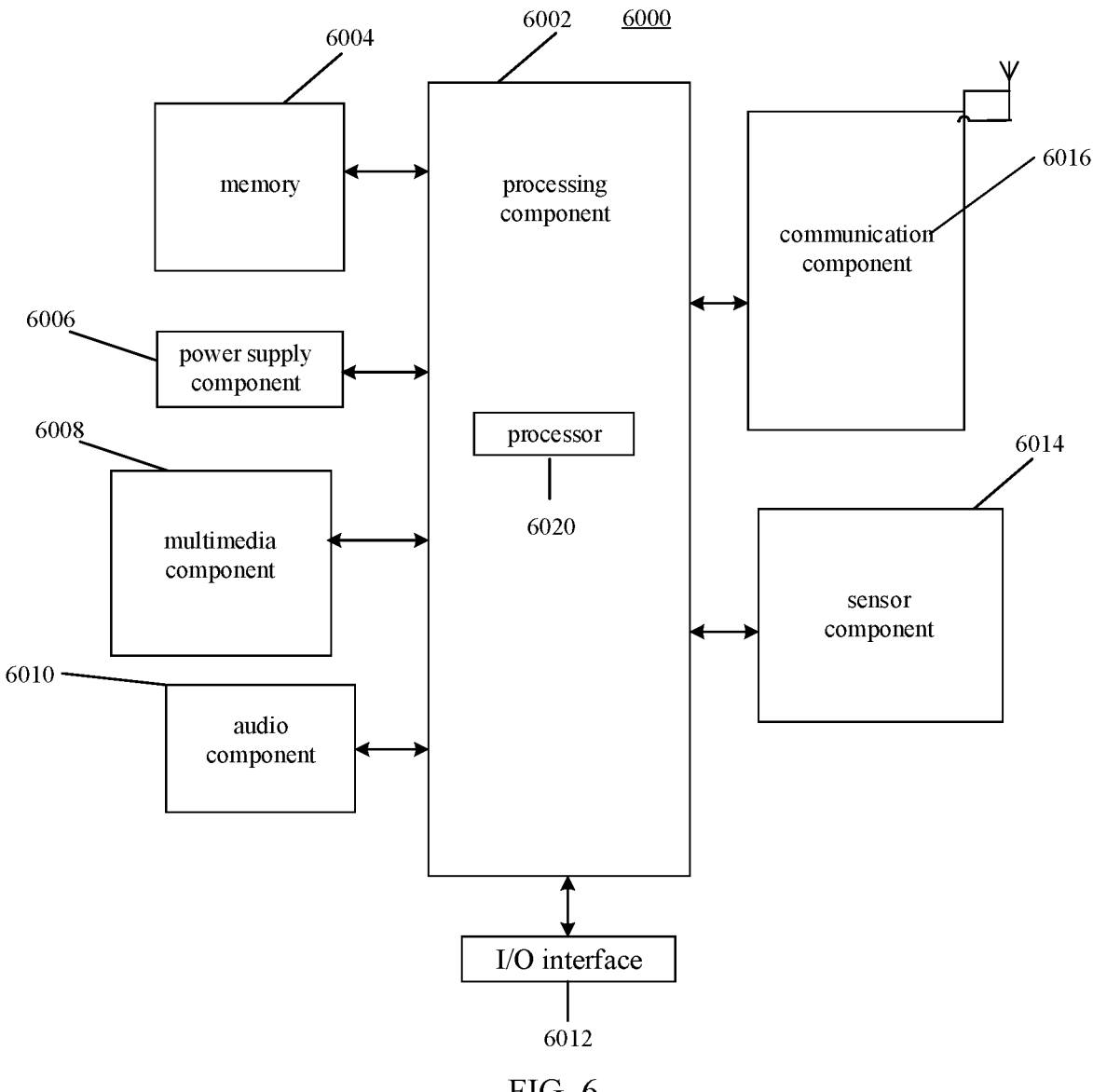
FIG. 6 is a diagram illustrating a structure of a UE according to some embodiments.

FIG. 6 is a block diagram illustrating a UE 6000 according to some embodiments. For example, the UE 6000 may be a mobile phone, a computer, a digital broadcasting terminal, a messaging device, a game console, a tablet device, a medical equipment, a fitness equipment, a personal digital assistant, etc.

As illustrated in FIG. 6, the UE 6000 may include one or more components: a processing component 6002, a memory 6004, a power supply component 6006, a multimedia component 6008, an audio component 6010, an input/output (I/O) interface 6012, a sensor component 6014, and a communication component 6016.

The processing component 6002 generally controls the whole operation of the UE 6000, such as the operations related to display, phone call, data communication, camera operation and recording operation. The processing component 6002 may include one or more processors 6020 to perform instructions, to complete all or part of blocks of the above method. In addition, the processing component 6002 may include one or more modules for the convenience of interaction between the processing component 6002 and other components. For example, the processing component 6002 may include a multimedia module for the convenience of interaction between the multimedia component 6008 and the processing component 6002.

The memory 6004 is configured to store all types of data to support the operation of the device 6000. Examples of the data include the instructions of any applications or methods operated on the UE 6000, contact data, phone book data, messages, pictures, videos, etc. The memory 6004 may be implemented by any type of volatile or non-volatile storage devices or their combination, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The communication component 6016 is configured for the convenience of wire or wireless communication between the UE 6000 and other devices. The UE 6000 may access a wireless network based on a communication standard, such as Wi-Fi, 2G or 3G, or their combination. In some embodiments, the communication component 6016 receives broadcast signals or broadcast-related information from an external broadcast management system via a broadcast channel. In an exemplary embodiment, the communication component 6016 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In some embodiments, the UE 6000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method for locating the UE.

In some embodiments, a non-transitory computer readable storage medium including instructions is further provided, such as the memory 6004 including instructions. The instructions may be executed by the processor 6020 of the UE 6000 to complete the above method for locating the UE. For example, the non-transitory computer readable storage medium may be a ROM, a random-access memory (RAM), a CD-ROM, a magnetic tape, a floppy disk, an optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A method for locating a user equipment (UE), performed by a network device, comprising:
   receiving one or more identifiers of one or more nearby UEs discovered by an assistant UE, reported by the assistant UE;
   sending a locating request message to the assistant UE, wherein the locating request message carries identifier information of a target UE to be located, and the target UE to be located is selected from the one or more nearby UEs; and
   acquiring a relative location between the assistant UE and the target UE, reported by the assistant UE, and determining a location of the target UE based on a location of the assistant UE and the relative location, wherein the relative location is a location of the assistant UE relative to the target UE;
   wherein the relative location between the assistant UE and the target UE is acquired by the assistant UE locally based on the identifier information of the target UE after receiving the locating request message, and is reported to the network device, or the relative location between the assistant UE and the target UE is determined by the assistant UE by locating the target UE in response to the assistant UE not acquiring the relative location information between the assistant UE and the target UE locally and is reported to the network device.

2. The method as claimed in claim 1, further comprising:
   receiving a measurement report of a UE, and determining the UE as the assistant UE based on the measurement report.

3. The method as claimed in claim 2, wherein, the measurement report comprises at least one of:
   location information, a reference signal time difference (RSTD), a reference signal receiving power (RSRP), or a signal to noise ratio (SINR);
   determining the UE as the assistant UE based on the measurement report, comprises: determining the UE as the assistant UE dynamically based on at least one of: the location information, the RSTD, the RSRP, or the SINR.

4. The method as claimed in claim 1, further comprising:
   using a UE that is fixed at a set location based on a communication environment as the assistant UE;
   wherein, a location of the UE that is fixed, is configured into the network device.

5. The method as claimed in claim 1, further comprising:
   configuring a resource for the assistant UE, wherein the resource is configured for the assistant UE to discover the nearby UE to acquire a relative location between the assistant UE and the nearby UE.

6. The method as claimed in claim 1, wherein the locating request message carries information requesting the location of the assistant UE.

7. A method for locating a user equipment (UE), performed by an assistant UE, comprising:
   reporting one or more identifiers of one or more nearby UEs discovered by an assistant UE;
   receiving a locating request message sent by a network device, wherein the locating request message carries an identifier of a target UE to be located, and the target UE to be located is selected from the one or more nearby UEs;
   acquiring a relative location between the assistant UE and the target UE based on the identifier of the target UE; and
   reporting the relative location to the network device, wherein the relative location is a location of the assistant UE relative to the target UE;
   wherein the method further comprises:
   in response to the assistant UE acquiring the relative location between the assistant UE and the target UE locally based on the identifier of the target UE after receiving the locating request message, reporting the acquired relative location information to the network device; or,
   in response to the assistant UE not acquiring the relative location information between the assistant UE and the target UE locally, locating the target UE, determining the relative location information between the assistant UE and the target UE, and reporting the relative location information between the assistant UE and the target UE to the network device.

8. The method as claimed in claim 7, wherein,
   the assistant UE is determined dynamically by the network device based on a measurement report of the assistant UE; or
   the assistant UE is fixed at a predefined location based on a communication environment.

9. The method as claimed in claim 7, further comprising:
   receiving a resource configuration configured by the network device, wherein the assistant UE discovers the target UE using the configured resource.

10. The method as claimed in claim 9, further comprising:
   discovering the target UE using the resource, and reporting an identifier of the discovered target UE to the network device.

11. The method as claimed in claim 9, further comprising:
   locating the discovered target UE and determining the relative location between the assistant UE and the discovered target UE when the assistant UE discovers the target UE based on the resource.

12. The method as claimed in claim 7, wherein, locating by the assistant UE the target UE, comprises:
   determining the relative location between the assistant UE and the target UE based on an Uu interface communication, wherein the assistant UE and the target UE send data or receive data on an uplink resource of the Uu interface.

13. The method as claimed in claim 7, wherein, locating by the assistant UE the target UE, comprises:
   determining, by the assistant UE, the relative location between the assistant UE and the target UE, based on a sidelink communication, wherein the sidelink communication is performed between the assistant UE and the target UE.

14. A network device, comprising:

a processor, a transceiver, a memory, and an executable program stored on the memory and run by the processor, wherein the processor is configured to run the executable program to:

receive one or more identifiers of one or more nearby UEs discovered by an assistant UE, reported by the assistant UE;

send a locating request message to the assistant UE, wherein the locating request message carries identifier information of a target UE to be located, and the target UE to be located is selected from the one or more nearby UEs; and acquire a relative location between the assistant UE and the target UE, reported by the assistant UE, and determine a location of the target UE based on a location of the assistant UE and the relative location, wherein the relative location is a location of the assistant UE relative to the target UE;

wherein the relative location between the assistant UE and the target UE is acquired by the assistant UE locally based on the identifier information of the target UE after receiving the locating request message, and is reported to the network device, or the relative location between the assistant UE and the target UE is determined by the assistant UE by locating the target UE in response to the assistant UE not acquiring the relative location information between the assistant UE and the target UE locally and is reported to the network device.

15. The device as claimed in claim 14, wherein the processor is configured to run the executable program to:

receive a measurement report of a UE, and determining the UE as the assistant UE based on the measurement report.

16. A non-transitory computer-readable storage medium having stored therein instructions that, when executed by a processor of a network device, causes the network device to perform the method as claimed in claim 1.

17. A user equipment (UE), comprising:

a processor, a transceiver, a memory, and an executable program stored on the memory and run by the processor, wherein the processor is configured to run the executable program to performed the method as claimed in claim 7.

18. A non-transitory computer-readable storage medium having stored therein instructions that, when executed by a processor of a network device, causes the network device to perform the method as claimed in claim 7.

\*  \*  \*  \*  \*